United States Patent
Ge et al.

(10) Patent No.: US 11,936,869 B2
(45) Date of Patent: Mar. 19, 2024

(54) IMAGE COMPRESSION SAMPLING METHOD AND ASSEMBLY

(71) Applicant: INSPUR SUZHOU INTELLIGENT TECHNOLOGY CO., LTD., Jiangsu (CN)

(72) Inventors: Yuan Ge, Jiangsu (CN); Hongzhi Shi, Jiangsu (CN); Jian Zhao, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/246,470

(22) PCT Filed: Jul. 30, 2021

(86) PCT No.: PCT/CN2021/109503
§ 371 (c)(1),
(2) Date: Mar. 23, 2023

(87) PCT Pub. No.: WO2022/110867
PCT Pub. Date: Jun. 2, 2022

(65) Prior Publication Data
US 2023/0353739 A1 Nov. 2, 2023

(30) Foreign Application Priority Data
Nov. 27, 2020 (CN) .......................... 202011363452.8

(51) Int. Cl.
G06K 9/36 (2006.01)
H04N 19/119 (2014.01)
(Continued)

(52) U.S. Cl.
CPC ......... H04N 19/126 (2014.11); H04N 19/119 (2014.11); H04N 19/132 (2014.11);
(Continued)

(58) Field of Classification Search
CPC .. H04N 19/126; H04N 19/176; H04N 19/119; H04N 19/132; H04N 19/88;
(Continued)

(56) References Cited

U.S. PATENT DOCUMENTS

| | | | |
|---|---|---|---|
| 5,682,152 A | * | 10/1997 | Wang ...................... H03M 7/46 375/E7.14 |
| 6,067,384 A | | 5/2000 | Manickam et al. |

(Continued)

FOREIGN PATENT DOCUMENTS

| | | |
|---|---|---|
| CN | 103413331 A | 11/2013 |
| CN | 107516301 A | 12/2017 |

(Continued)

OTHER PUBLICATIONS

Search report for PCT/CN2021/109503 dated Nov. 2, 2021.
Chinese search report for 202011363452.8, filed Nov. 27, 2020.

*Primary Examiner* — Duy M Dang
(74) *Attorney, Agent, or Firm* — Dennemeyer & Associates LLC; Victoria Friedman

(57) ABSTRACT

An image compression sampling method and assembly are provided. The method includes: performing sparse representation on a target image by using an initial sparse matrix, quantifying an initial sparse representation result to obtain an optimized sparse representation result, and obtaining an optimized sparse matrix; constructing a product matrix by using the optimized sparse matrix and an initial measurement matrix, and adjusting absolute values of off-diagonal elements in the product matrix to be less than a correlation threshold; performing singular value decomposition on the product matrix to obtain a diagonal matrix and a left singular matrix, and updating the diagonal matrix according to a quantity of samplings of the initial measurement matrix; and optimizing the initial measurement matrix by using the left singular matrix and the updated diagonal matrix to obtain an (Continued)

optimized measurement matrix, and collecting image data by using the optimized sparse matrix and the optimized measurement matrix.

20 Claims, 4 Drawing Sheets

(51) Int. Cl.
*H04N 19/126* (2014.01)
*H04N 19/132* (2014.01)
*H04N 19/176* (2014.01)
*H04N 19/88* (2014.01)
*H04N 19/895* (2014.01)

(52) U.S. Cl.
CPC ........... *H04N 19/176* (2014.11); *H04N 19/88* (2014.11); *H04N 19/895* (2014.11)

(58) Field of Classification Search
CPC .... H04N 19/895; H04N 19/117; H04N 19/85; H04N 2201/3238; H04N 19/124; H04N 5/9264; H04N 9/8047; H04N 11/044; H04N 19/625; G09G 2340/02; H03M 7/302; G06T 9/007; G06F 16/7864
See application file for complete search history.

(56) References Cited

U.S. PATENT DOCUMENTS

| | | | |
|---|---|---|---|
| 6,671,414 B1 * | 12/2003 | Micchelli | H04N 19/60 382/244 |
| 10,432,937 B2 * | 10/2019 | Gervais | H04N 19/18 |
| 10,742,982 B2 * | 8/2020 | Wang | H04N 19/593 |
| 2009/0196513 A1 * | 8/2009 | Tian | H04N 19/60 382/232 |

FOREIGN PATENT DOCUMENTS

| | | |
|---|---|---|
| CN | 108832934 A | 11/2018 |
| CN | 109447921 A | 3/2019 |
| CN | 109756740 A | 5/2019 |
| CN | 111817723 A | 10/2020 |
| CN | 112511824 A | 3/2021 |

* cited by examiner

IMAGE COMPRESSION SAMPLING METHOD AND ASSEMBLY

CROSS-REFERENCE TO RELATED APPLICATIONS

This is a 35 U.S.C. 371 National Stage Patent Application of International Application No. PCT/CN2021/109503, filed Jul. 30, 2021, which claims priority to Chinese application 202011363452.8, filed Nov. 27, 2020, each of which is hereby incorporated by reference in its entirety.

TECHNICAL FIELD

The present disclosure relates to the technical field of image processing, in particular, to an image compression sampling method and assembly.

BACKGROUND

Image compression sampling generally uses a sparse matrix and a measurement matrix for signal collection. A sparsity of transformation results of a traditional sparse transformation matrix difficultly meets a sparsity requirement, and a correlation between the measurement matrix and the sparse transformation matrix needs to be verified by multiple calculations. The process is relatively complex, and it is difficult to determine an appropriate sparse matrix and measurement matrix for image compression sampling.

Therefore, how to determine an appropriate sparse matrix and measurement matrix for image compression sampling is a problem that needs to be solved by those skilled in the art.

SUMMARY

In view of this, the present disclosure aims to provide an image compression sampling method and assembly, so as to determine an appropriate sparse matrix and measurement matrix for image compression sampling. Specific solutions are as follows:

In a first aspect, the present disclosure provides an image compression sampling method, including:
  performing sparse representation on a target image by using an initial sparse matrix to obtain an initial sparse representation result;
  quantifying the initial sparse representation result to obtain an optimized sparse representation result, and optimizing the initial sparse matrix according to the optimized sparse representation result to obtain an optimized sparse matrix;
  constructing a product matrix by using the optimized sparse matrix and an initial measurement matrix, and adjusting absolute values of off-diagonal elements in the product matrix to be less than a correlation threshold;
  performing singular value decomposition on the adjusted product matrix to obtain a diagonal matrix and a left singular matrix, and updating the diagonal matrix according to a quantity of samplings of the initial measurement matrix; and
  optimizing the initial measurement matrix by using the left singular matrix and the updated diagonal matrix to obtain an optimized measurement matrix, and collecting image data by using the optimized sparse matrix and the optimized measurement matrix.

In an embodiment, the step of performing sparse representation on a target image by using an initial sparse matrix to obtain an initial sparse representation result includes:
  dividing the target image into multiple blocks, and representing each block by a single column;
  splicing all the single columns, and obtaining an image matrix of the target image; and
  determining a product of the image matrix and the initial sparse matrix to be the initial sparse representation result.

In an embodiment, the step of performing sparse representation on a target image by using an initial sparse matrix to obtain an initial sparse representation result includes:
  performing the sparse representation on the target image by using the initial sparse matrix, and performing rearrangement according to a preset rule to obtain the initial sparse representation result, wherein the preset rule is row/column rearrangement in a zigzag shape, or in a hollow square shape, or after column stretching.

In an embodiment, the step of quantifying the initial sparse representation result to obtain an optimized sparse representation result includes:
  setting part of elements in the initial sparse representation result to be 0 according to a preset quantification table to obtain the optimized sparse representation result.

In an embodiment, the step of updating the initial sparse matrix according to the optimized sparse representation result to obtain an optimized sparse matrix includes:
  determining a sparse error between the optimized sparse representation result and the initial sparse representation result, and solving a minimum value of the sparse error according to a target function to obtain the optimized sparse matrix; and
  the target function is: $\min\{\|S-\psi_0 X\|F^2\}$, where S is the optimized sparse representation result; $\psi 0$ is the initial sparse matrix; X is the image matrix; and F is an F-norm.

In an embodiment, the step of solving the minimum value of the sparse error according to a target function to obtain the optimized sparse matrix includes:
  updating each column in the initial sparse matrix according to a first formula to obtain the optimized sparse matrix, the first formula being $\psi_n = S_n X_n^T \times (X_n X_n^T)^{-1}$;
  where $\psi_n$ is an nth column in the optimized sparse matrix; $S_n$ is an nth column in the optimized sparse representation result; $X_n$ is an nth column in the image matrix; and $X_n^T$ is an nth column of a transposed matrix of the image matrix.

In an embodiment, the step of solving the minimum value of the sparse error according to a target function to obtain the optimized sparse matrix includes:
  updating the initial sparse matrix according to a second formula to solve the minimum value, and obtaining the optimized sparse matrix, the second formula being $\psi = S X^T \times (X X^T)^{-1}$;
  where $\psi$ is the optimized sparse matrix; S is the optimized sparse representation result; X is the image matrix; and $X^T$ is a transposed matrix of the image matrix.

In an embodiment, the step of adjusting absolute values of off-diagonal elements in the product matrix to be less than a correlation threshold includes:
  determining, from the product matrix, that off-diagonal elements with absolute values greater than the correlation threshold as target elements; and
  calculating a product of any target element and a preset iteration factor, and replacing the current target element with the product until the absolute values of the off-diagonal elements in the product matrix are all less than the correlation threshold.

In an embodiment, the step of updating the diagonal matrix according to a quantity of samplings of the initial measurement matrix includes:

randomly reserving M nonzero elements in the diagonal matrix, and setting remaining nonzero elements to be 0, so as to update the diagonal matrix, where the M is a quantity of rows of the initial measurement matrix.

In an embodiment, the step of updating the initial measurement matrix by using the left singular matrix and the updated diagonal matrix to obtain an optimized measurement matrix includes:

optimizing the initial measurement matrix according to a third formula to obtain the optimized measurement matrix, the third formula being $\varphi=\sqrt{W} \times U^T$;

where $\varphi$ is the optimized measurement matrix; W is the updated diagonal matrix; and U is the left singular matrix.

In a second aspect, the present disclosure provides an image compression sampling apparatus, including:

a sparse representation module, configured to perform sparse representation on a target image by using an initial sparse matrix to obtain an initial sparse representation result;

a first optimization module, configured to quantify the initial sparse representation result to obtain an optimized sparse representation result, and optimize the initial sparse matrix according to the optimized sparse representation result to obtain an optimized sparse matrix;

an adjustment module, configured to construct a product matrix by using the optimized sparse matrix and an initial measurement matrix, and adjust absolute values of off-diagonal elements in the product matrix to be less than a correlation threshold;

a dimension reduction module, configured to perform singular value decomposition on the adjusted product matrix to obtain a diagonal matrix and a left singular matrix, and update the diagonal matrix according to a quantity of samplings of the initial measurement matrix; and a second optimization module, configured to optimize the initial measurement matrix by using the left singular matrix and the updated diagonal matrix to obtain an optimized measurement matrix, and collect image data by using the optimized sparse matrix and the optimized measurement matrix.

In a third aspect, the present disclosure provides an image compression sampling device, including:

a memory, configured to store a computer program; and
a processor, configured to implement, when executing the computer program, the foregoing image compression sampling method.

In a fourth aspect, the present disclosure provides a readable-storage medium, configured to store a computer program. The computer program is executed by a processor to implement the foregoing image compression sampling method.

According to the above embodiment, the present disclosure provides an image compression sampling method, including: performing sparse representation on a target image by using an initial sparse matrix to obtain an initial sparse representation result; quantifying the initial sparse representation result to obtain an optimized sparse representation result, and optimizing the initial sparse matrix according to the optimized sparse representation result to obtain an optimized sparse matrix; constructing a product matrix by using the optimized sparse matrix and an initial measurement matrix, and adjusting absolute values of off-diagonal elements in the product matrix to be less than a correlation threshold; performing singular value decomposition on the adjusted product matrix to obtain a diagonal matrix and a left singular matrix, and updating the diagonal matrix according to a quantity of samplings of the initial measurement matrix; and optimizing the initial measurement matrix by using the left singular matrix and the updated diagonal matrix to obtain an optimized measurement matrix, and collecting image data by using the optimized sparse matrix and the optimized measurement matrix.

It can be seen that the present disclosure can optimize a sparse matrix and a measurement matrix, so that the sparsity of the sparse matrix and the quantity of samplings of the measurement matrix are reasonable values. Meanwhile, the correlation between the sparse matrix and the measurement matrix is reduced. If the correction between the sparse matrix and the measurement matrix is lower, a signal reconstruction effect is better. It can be seen that the sparse matrix and the measurement matrix are optimized as much as possible, complex images can be sampled, and a recovery effect is better.

Correspondingly, an image compression sampling assembly (that is, apparatus, device and readable storage medium) also has the above technical effect.

BRIEF DESCRIPTION OF THE DRAWINGS

In order to describe the embodiments of the present disclosure or the technical solutions in the existing art more clearly, drawings required to be used in the embodiments or the illustration of the existing art will be briefly introduced below. Apparently, the drawings in the illustration below are only some embodiments of the present disclosure. Those ordinarily skilled in the art also can obtain other drawings according to the provided drawings without creative work.

DETAILED DESCRIPTION OF THE EMBODIMENTS

Figure 1:
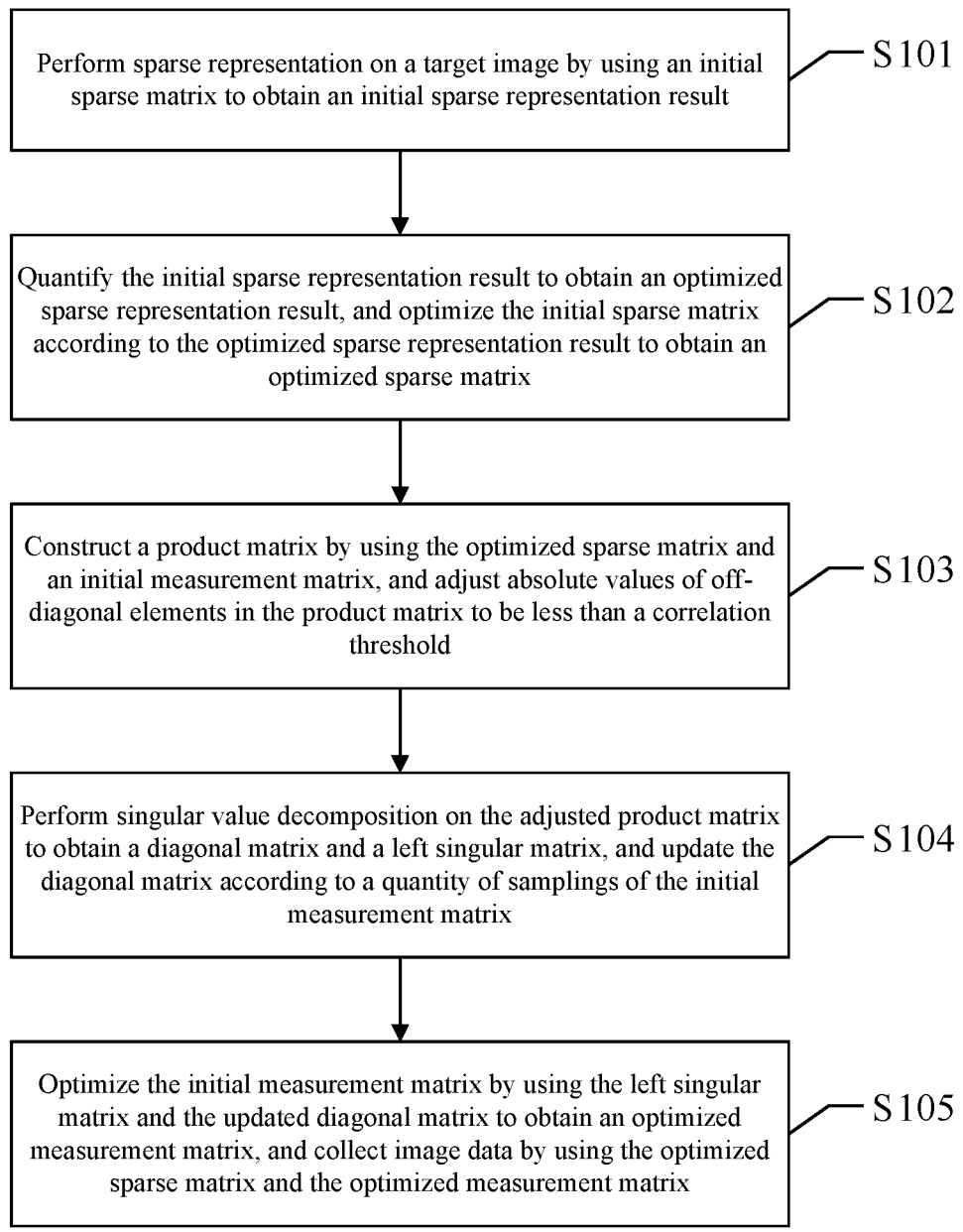
FIG. 1 is a flow chart of an image compression sampling method disclosed by the present disclosure.

The following will make a clear and complete description of the technical solutions in the embodiments of the present disclosure in combination with the drawings in the embodiments of the present disclosure. Obviously, the described embodiments are only part of the embodiments of the present disclosure, not all of them. Based on the embodiments in the present disclosure, all other embodiments obtained by those of ordinary skill in the art without creative work all fall within the protection scope of the present disclosure.

At present, a sparsity of transformation results of a traditional sparse transformation matrix difficultly meets a sparsity requirement, and a correlation between the measurement matrix and the sparse transformation matrix needs to be verified by multiple calculations. The process is relatively complex, and it is difficult to determine an appropriate sparse matrix and measurement matrix for image compression sampling. In view of this, the present disclosure provides an image compression sampling solution, which can determine an appropriate sparse matrix and measurement matrix for image compression sampling.

Before introducing the present disclosure, the relevant backgrounds are introduced as follows.

Image compression sensing includes two core technologies: compression sampling and signal reconstruction. The compression sampling includes: finding a method for sparse representation of a signal, implementing sparse transformation of an original signal in nature, and obtaining a sparse representation containing only K nonzero values; and designing a stable measurement matrix to reduce a dimension of the signal to generate a measured value, so as to ensure that the K nonzero values are not destroyed after the dimension of the signal is reduced. The signal reconstruction includes: recovering an original signal from a measured value as accurately as possible, which determines a computational complexity, accuracy and robustness of a reconstruction algorithm.

Sparse representation means that many signals in nature are sparse or compressible to a certain extent. When represented by an appropriate basis fir, the signals can have many concise expressions. The sparse transformation of a signal in a certain representation manner is the basis of signal processing in a compressed sensing theory. Classical sparse transformation mainly includes wavelet transform, Fourier transform (FT) and Discrete Cosine Transformation (DCT). These sparse representation manners are simple in construction and fast in computation, and are more suitable for compression imaging that requires large-scale data operations and have simple original signal information.

When a transformation coefficient of a signal x on a sparse transformation is sparse, if the sparse coefficient is linearly transformed with a measurement matrix unrelated to a sparse transformation matrix to obtain an observed value y, the signal x can be reconstructed by solving an optimization problem. The design of the measurement matrix determines a range for measuring a minimum quantity of times of sampling range or sparsity, which is an important direction of the compressed sensing theory. A constraint condition that determines whether a reconstruction succeeds is that a sensing matrix meets a Restricted Isometry Property (RIP). The sensing matrix is a product of the measurement matrix and the sparse matrix. At present, it is proved that compression sensing measurement matrixes which have a large probability of satisfying this constraint condition includes an independent identically distributed random Gaussian matrix and random Bernoulli matrix.

Sensing matrixes include a sparse transformation matrix and a measurement matrix. Ideal lossless DCT, Fourier transform (FT) and wavelet transform are mainstream methods of sparse transformation, which are simple in structure, but have an unideal sparse effect on signals with complex images and rich details, and a recovery accuracy easily reach a bottleneck.

At present, a mainstream measurement matrix implementation method is that: In order to ensure a better reconstruction effect for compression sensing, it is necessary to design and construct a stable measurement matrix to ensure a reduced dimension and reserve K nonzero portions of the signal. The measurement matrix mainly satisfies the following conditions: random measurement and noncorrelation with fir. The RIP is usually used as a constraint condition of the measurement matrix. The random Gaussian matrix and the random Bernoulli matrix belong to completely random measurement matrixes. In theory, it is proved that they can be used as measurement matrixes which are almost not correlated to any sparse signal. Therefore, a quantity of required measurements is the smallest, and the reconstruction accuracy is higher than that of a deterministic measurement matrix. However, during specific implementation, lots of storage resources will be occupied, so the random Gaussian matrix and the random Bernoulli matrix are not suitable for large-scale applications.

In practical applications, partially random measurement matrixes are preferred. Compared with a completely random measurement matrix, although randomness is reduced, a partially random measurement matrix is more suitable for practical applications. At present, a design method of the partially random measurement matrix is very simple. A basic construction idea is to randomly select M rows from N rows of an orthogonal square to construct a measurement matrix. However, this selection method greatly reduces the randomness and only satisfies the RIP of a certain order. A probability of successful reconstruction highly depends on row vectors. If selected row vectors are highly correlated, there is a certain possibility of a reconstruction failure. At the same time, since a recoverable sparsity K value is small, the partially random measurement matrix is only suitable for signals sparse in time domain and cannot satisfy most of natural images.

In order to improve the accuracy of compressed sensing signal reconstruction and adapt to more signals with complex image structures, on the premise of ensuring that the signals can be accurately recovered successfully, a minimum sampling rate can be used to generate measured values as few as possible.

It can be seen that the RIP of the sensing matrix can be regarded as a similarity between one matrix and a standard orthogonal matrix. That is, the measurement matrix tries to ensure that its base vector is uncorrelated to a base of the sparse transformation matrix. If the correction between the sparse matrix and the measurement matrix is lower, a signal recovery effect is better. A sensing matrix A is constructed by a product of a measurement matrix ψ and a sparse transformation matrix ψ, that is A=φψ, thereby constructing a product matrix F=ATA. An off-diagonal maximum value of F can be used to measure a cross correlation between the measurement matrix and the sparse matrix. Usually, a condition for accurate reconstruction is that the cross correlation is less than a lower boundary of a welch bound. The sparse transformation matrix remains unchanged. By means of constructing a product matrix F of the sensing matrix and its transposed matrix, off-diagonal absolute values of the product matrix F are reduced to the lower boundary of the Welch bound, and then singular value decomposition is performed on the adjusted product matrix F to deduce the measurement matrix. Iteration is repeated until values of nonzero elements of the matrix are all within a lower boundary threshold of Welch, so as to achieve an object of reducing the cross correlation between the measurement matrix and the sparse transformation matrix.

Referring to FIG. 1, an embodiment of the present disclosure discloses an image compression sampling method, including:

S101, performing sparse representation a target image by using an initial sparse matrix to obtain an initial sparse representation result.

The initial sparse matrix may be a wavelet transform matrix, a DCT matrix, a Fourier transform matrix, and the like. The target image may be a one-dimensional, two-dimensional or three-dimensional image.

It should be noted that for a three-dimensional image, it is necessary to convert the three-dimensional image to a two-dimensional image before S101 is performed. A conversion process includes slicing the three-dimensional image in an x direction or a y direction or a z direction to obtain a plurality of 2D pictures (i.e. slices). Generally, a direction with fewest pixel points is selected as a slicing direction, so that the amount of information in the two-dimensional pictures is relatively maximum. For example: a three-dimensional signal of 256(x)×480(y)×512(z) is cut into 256 two-dimensional pictures with a size of 480×512 on a plane [y, z] along the x direction, and each two-dimensional picture is taken as the target image to perform S101-S105.

Correspondingly, since the three-dimensional image is sliced before compression sampling, it is necessary to recombine each slice according to the slicing direction after all the slices are sampled, so as to obtain a three-dimensional data volume.

In a specific implementation, the step of performing sparse representation a target image by using an initial sparse matrix to obtain an initial sparse representation result includes: dividing the target image into multiple blocks, and representing each block by a single column; splicing all the single columns, and obtaining an image matrix of the target image; and determining a product of the image matrix and the initial sparse matrix to be the initial sparse representation result. To perform the sparse representation on the target image, the image is divided into small blocks, and the image matrix is constructed, so that image information can be distributed scatteredly, and loss of more useful information is avoided. Of course, the original image can also be directly represented by a matrix without division.

In a specific implementation, the step of performing sparse representation on a target image by using an initial sparse matrix to obtain an initial sparse representation result includes: performing the sparse representation on the target image by using the initial sparse matrix, and performing rearrangement according to a preset rule to obtain the initial sparse representation result. The preset rule is row/column rearrangement in a zigzag shape, or in a hollow square shape, or after column stretching. The row/column rearrangement after column stretching includes: stretching the images into column vectors, and recombining the column vectors according to rows or columns.

After the sparse representation is performed on the target image by using the initial sparse matrix, most of energy will be concentrated at an upper left corner (the upper left corner represents a low-frequency component of the image, and a lower right corner represents a high-frequency component of the image). Therefore, the rearrangement performed according to the preset rule can scatter the low-frequency component to different positions, making the image information distributed scatteredly and avoiding loss of more useful information.

If the initial sparse representation result is obtained after the rearrangement according to the preset rule, in the process of collecting the image data by using the optimized sparse matrix and the optimized measurement matrix, it is necessary to perform the rearrangement in a reverse direction according to the preset rule to recover a signal.

S102, the initial sparse representation result is quantified to obtain an optimized sparse representation result, and optimizing the initial sparse matrix according to the optimized sparse representation result to obtain an optimized sparse matrix.

In a specific implementation, the step of quantifying the initial sparse representation result to obtain an optimized sparse representation result includes: setting part of elements in the initial sparse representation result to be 0 according to a preset quantification table to obtain the optimized sparse representation result. The optimized sparse representation result needs to be as sparse as possible, that is, a quantity of nonzero elements in the matrix should be as small as possible. The preset quantification table records which element can approximate to 0. Therefore, part of elements in the initial sparse representation result can be set to be 0 according to the preset quantification table, so as to minimize the nonzero elements in the initial sparse representation result.

In a specific implementation, the step of updating the initial sparse matrix according to the optimized sparse representation result to obtain an optimized sparse matrix includes: determining a sparse error between the optimized sparse representation result and the initial sparse representation result, and solving a minimum value of the sparse error according to a target function to obtain the optimized sparse matrix. The target function is: $\min\{\|S-\psi_0 X\|_F^2\}$, where S is the optimized sparse representation result; $\psi_0$ is the initial sparse matrix; X is the image matrix; and F is an F-norm.

The initial sparse matrix can be updated by columns, or the entire matrix can be updated at one time.

In a specific implementation, the step of solving a minimum value of the sparse error according to a target function to obtain the optimized sparse matrix includes: updating each column in the initial sparse matrix according to a first formula to obtain the optimized sparse matrix. The first formula is $\psi_n = S_n X_n^T \times (X_n X_n^T)^{-1}$, where $\psi_n$ is an nth column in the optimized sparse matrix; $S_n$ is an nth column in the optimized sparse representation result; $X_n$ is an nth column in the image matrix; and $X_n^T$ is an nth column of a transposed matrix of the image matrix.

In a specific implementation, the step of solving a minimum value of the sparse error according to a target function to obtain the optimized sparse matrix includes: updating the initial sparse matrix according to a second formula to solve the minimum value, and obtaining the optimized sparse matrix. The second formula is $\psi = S X^T \times (X X^T)^{-1}$; where $\psi$ is the optimized sparse matrix; S is the optimized sparse representation result; X is the image matrix; and $X^T$ is a transposed matrix of the image matrix.

S103, constructing a product matrix by using the optimized sparse matrix and an initial measurement matrix, and adjusting absolute values of off-diagonal elements in the product matrix to be less than a correlation threshold.

In a specific implementation, the step of adjusting absolute values of off-diagonal elements in the product matrix to be less than a correlation threshold includes: determining, from the product matrix, that off-diagonal elements with absolute values greater than the correlation threshold as target elements; and calculating a product of any target element and a preset iteration factor, and replacing the current target element with the product until the absolute values of the off-diagonal elements in the product matrix are all less than the correlation threshold. The preset iteration factor is between 0 and 1, and different values can be taken in each iteration process. Furthermore, the preset iteration factor will be larger as the iteration process increases. For example, in a first iteration process, the preset iteration factor is 0.2, and in a second iteration process, the preset iteration factor is 0.5. Of course, the preset iteration factor can also take a constant value.

Assuming that there are five non-diagonal elements, in the product matrix, with absolute values greater than the correlation threshold, after the five non-diagonal elements are respectively multiplied with the preset iteration factor, the original five non-diagonal elements are replaced with the five products. If there is still a value, in the five products, greater than the correlation threshold, the preset iteration factor is decreased, and is then multiplied with the value, greater than the correlation threshold, in the products until the absolute values of all the off-diagonal elements are less than the correlation threshold.

The correlation threshold may be the lower boundary of the welch bound and a RIP constant.

S104, singular value decomposition is performed on the adjusted product matrix to obtain a diagonal matrix and a left singular matrix, and updating the diagonal matrix according to a quantity of samplings of the initial measurement matrix.

The singular value decomposition is performed on the adjusted product matrix F, and there is $F=U \times W \times V^T$, where U is the left singular matrix, $U=FF^T=U\Lambda_1 U^T$; V is the right singular matrix, $V=F^T F=V\Lambda_2 V^T$; and W is the diagonal matrix. The nonzero elements on diagonals $\Lambda_1$ and $\Lambda_2$ are the same. If the nonzero elements of $\Lambda_1$ or $\Lambda_2$ correspond to $\lambda_1$, $\lambda_2, \ldots, \lambda_k$, k≤N, the nonzero elements of a diagonal W correspond respectively $\sigma_1, \sigma_2, \ldots, \sigma_k$, and there is $\sigma i=\sqrt{\lambda i}$ (i=1, 2, . . . k).

Definition of the singular value decomposition is as follows: A matrix A of m×n is provided, and the singular value decomposition of A is represented by $A=P\Sigma Q^T$. $P=AA^T=P\Lambda_1 P^T$ is a symmetric matrix of m×m; $Q=A^T A=Q\Lambda_2 Q^T$ is a symmetric matrix of n×n; $\Sigma$ is an element on a diagonal, which is referred to as a singular value, and is a matrix of m×n. P and Q are required to be unit orthogonal matrixes. Obviously, $\Lambda_1$ and $\Lambda_2$ are different in size, but the nonzero elements on the diagonals are the same. If the nonzero elements of $\Lambda_1$ or $\Lambda_2$ correspond to $\lambda_1$, $\lambda_2, \ldots, \lambda_K$, K≤min (m, n), the nonzero elements of diagonal $\Sigma$ correspond respectively $\sigma_1, \sigma_2, \ldots, \sigma_k$, and there is $\sigma i=\sqrt{\lambda i}$ (i=1, 2, . . . k).

In an embodiment, the updating the diagonal matrix according to a quantity of samplings of the initial measurement matrix includes: randomly reserving M nonzero elements in the diagonal matrix, and setting remaining nonzero elements to be 0, so as to update the diagonal matrix. The M is a quantity of rows of the initial measurement matrix.

S105, optimizing the initial measurement matrix by using the left singular matrix and the updated diagonal matrix to obtain an optimized measurement matrix, and collecting image data by using the optimized sparse matrix and the optimized measurement matrix.

In a specific implementation, the updating the initial measurement matrix by using the left singular matrix and the updated diagonal matrix to obtain an optimized measurement matrix includes: optimizing the initial measurement matrix according to a third formula to obtain the optimized measurement matrix. The third formula is $\varphi=\sqrt{W} \times U^T$;

where $\varphi$ is the optimized measurement matrix; W is the updated diagonal matrix; U is the left singular matrix; and $U^T$ is the transposed matrix of U.

It can be seen that this embodiment of the present disclosure can optimize a sparse matrix and a measurement matrix, so that a sparsity of the sparse matrix and a quantity of samplings of the measurement matrix are reasonable values. Meanwhile, the correlation between the sparse matrix and the measurement matrix is reduced. If the correction between the sparse matrix and the measurement matrix is lower, a signal reconstruction effect is better. It can be seen that the sparse matrix and the measurement matrix are optimized as much as possible, complex images can be sampled, and a recovery effect is better.

Figure 2:
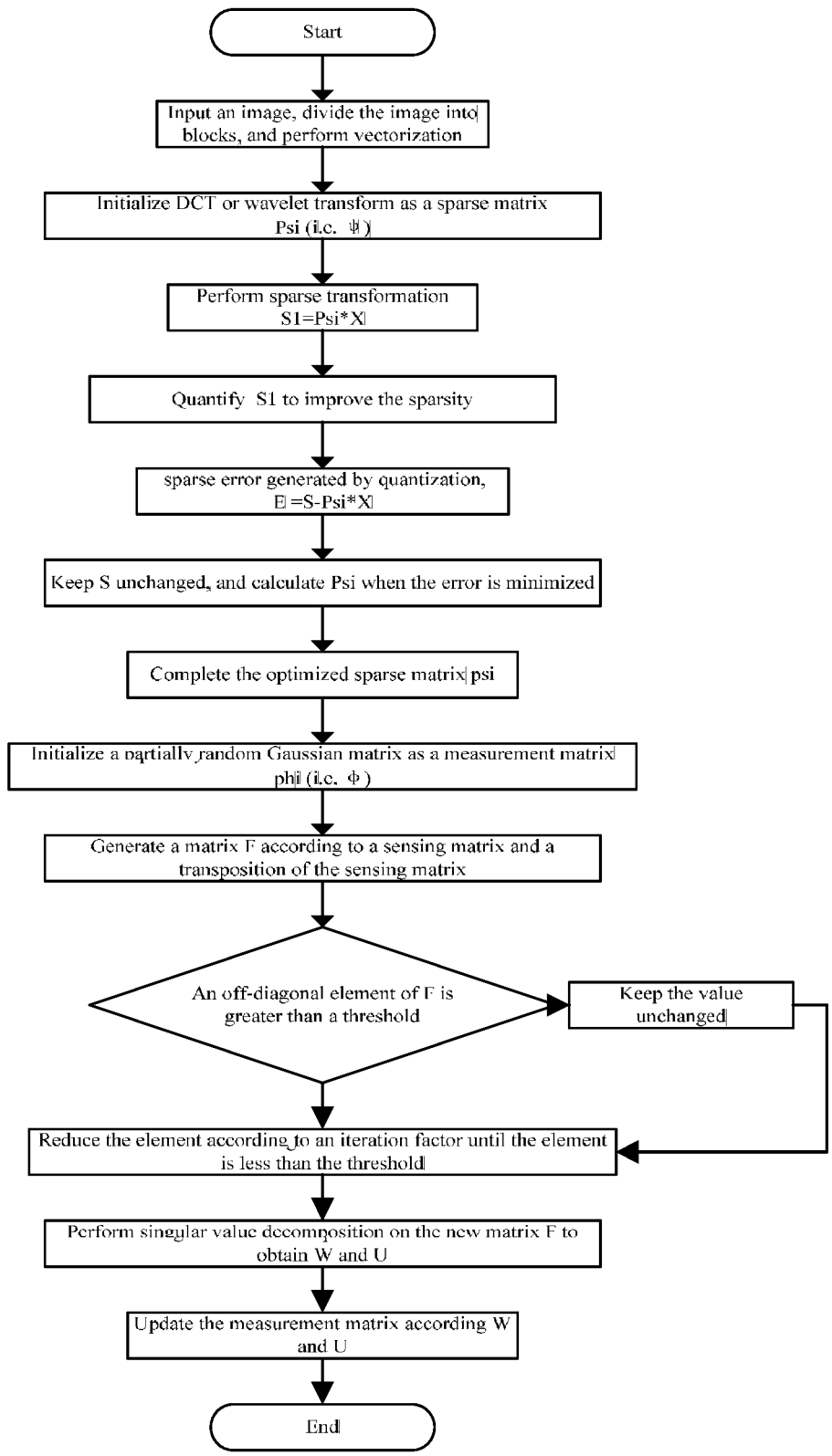
FIG. 2 is a flow chart of another image compression sampling method disclosed by the present disclosure.

Referring to FIG. 2, two-dimensional image is taken as an example, and this embodiment of the present disclosure discloses another image compression sampling method. Specific implementation steps include:

Step 1: A series of images is selected as a data set for training a sparse matrix.

Each original image is divided into blocks: The image is divided into multiple blocks according to n×n. If the number of columns or rows of the original image is not an integral multiple of n, edges are aligned with 0.

Step 2: All the blocks (image segments) are represented by $x_1, x_2, \ldots x_N$, and one image can be represented as $X=[x_1, x_2, \ldots x_N]$. Column quantification is performed on each block xi to obtain a single column. For example, an original image with a pixel of 512×512 is divided into blocks with a pixel of 16×16. Each block of 16×16 is stretched into a single column of 256×1. All the single columns are spliced in sequence into an image matrix X.

Step 3: Sparse transformation is performed on the image by using a wavelet transform matrix or a DCT matrix as an initial sparse matrix $\psi$, so that the image is sparsely transformed from space domain to frequency domain, which may be specifically implemented by matrix multiplication. For example: $S_1=\psi X$, where $S_1=[s_1, s_2, \ldots s_n]$, and $S_1$ is an initial sparse representation result of X.

Step 4: To achieve a better sparsity effect, $S_1$ is quantified, so as to obtain an optimized sparse representation result, and an error between $S_1$ and the optimized sparse representation result is referred to as E.

Step 5: $E=S-S_1$, $S_1=\psi X$, S is the optimized sparse representation result. A sparse error is defined as: $\|E\|_F^2=\|S-\psi X\|_F^2$, where F is an F norm of the matrix. A target function solved in the following steps is represented as min{$\|S-\psi X\|_F^2$}, which satisfies $\|S\|_0 \leq K$. K is a quantity of nonzero elements in S, and is generally based on experience.

Step 6: $\psi$ is updated column by column according to S.

For an nth column $\psi_n$ of $\psi$ and an nth row $S_n$ of S, there is: $\|S-\psi X\|_F^2=\|Sn-\psi n Xn\|_F^2=\|E\|_F^2$, where n=1, 2, . . . N, and $X_n$ is an nth row of X.

Step 7: $S_n$ is taken as an example. If derivatives of both sides of the equation in Step 6 are obtained, there is: $(S_n-\psi_n X_n) X_n^T=0$.

Step 8: $\psi_n$ is updated, $\psi_n=S_n X_n^T \times (X_n \times X_n^T)^{-1}$.

Step 9: The above steps are repeated to calculate other columns of $\psi$, thereby obtaining an optimized sparse matrix. This optimization process is represented by formula: $\psi_n=S_n X_n^T \times (X_n X_n^T)^{-1}$.

Step 10: A random Gaussian matrix or a random Bernoulli matrix of M×N is generated and taken as the initial measurement matrix $\varphi$, where N is a signal length (column) and M is a quantity of samplings (row).

Step 11: A sensing matrix $A=\varphi\psi$ is constructed, where $\psi$ is the optimized sparse matrix. Since a length of a column vector of the sensing matrix is not 1, A is first standardized to generate a standardized matrix A #. A product matrix F=A #$^T$A # is constructed, where A is the matrix of M×N, and F is a square matrix of N×N.

Step 12: A correlation threshold is calculated: A lower boundary of a welch bound is taken as an example, and the correlation threshold is:

$$\text{welch} = \frac{N-M}{M(N-1)}.$$

Absolute values $x_{ij}$ of all off-diagonal elements in F, i, j=0, 1, ... M, where the element $x_{ij}$ in row i and column j of the matrix F is a column coherence of an ith column of the initial measurement matrix φ and a jth column of the optimized sparse matrix ψ. If the column coherence is less than the correlation threshold, it can satisfy in theory that the measurement matrix and the sparse transformation matrix are not coherent.

Step 13: For the off-diagonal element $x_{ij}$ with the absolute value greater than the correlation threshold, there is $x'=ax_{ij}$. A value of the iteration factor $a \in (0,1)$. $x'<x$ for each iteration. The iteration factor a of each round can be selected from small to large by referring to a difference between the absolute value of the off-diagonal element and the correlation threshold. Step 13 is repeated until all the non-diagonal elements of the matrix F are less than the correlation threshold, and the iteration is stopped. The non-diagonal elements with the absolute values less than the welch threshold are kept unchanged, and a final matrix F is output.

Step 14: Singular value decomposition is performed on the new F, and $F=U \times W \times V^T$ is made.

Step 15: Generally, if a quantity of diagonal elements in W is greater than M, M nonzero elements in W are kept the same, and other elements are set to be zero to obtain new W.

Step 16: The measurement matrix is updated with W and U, and the measurement matrix $\varphi = \sqrt{W} \times U^T$ is optimized.

Step 17: The optimized sparse matrix ψ and the optimized measurement matrix φ participate in compression sampling of signals, and signal reconstruction is performed according to the above to recover the signals. The processes of image signal collection and reconstruction can refer to FIG. 3.

Figure 3:
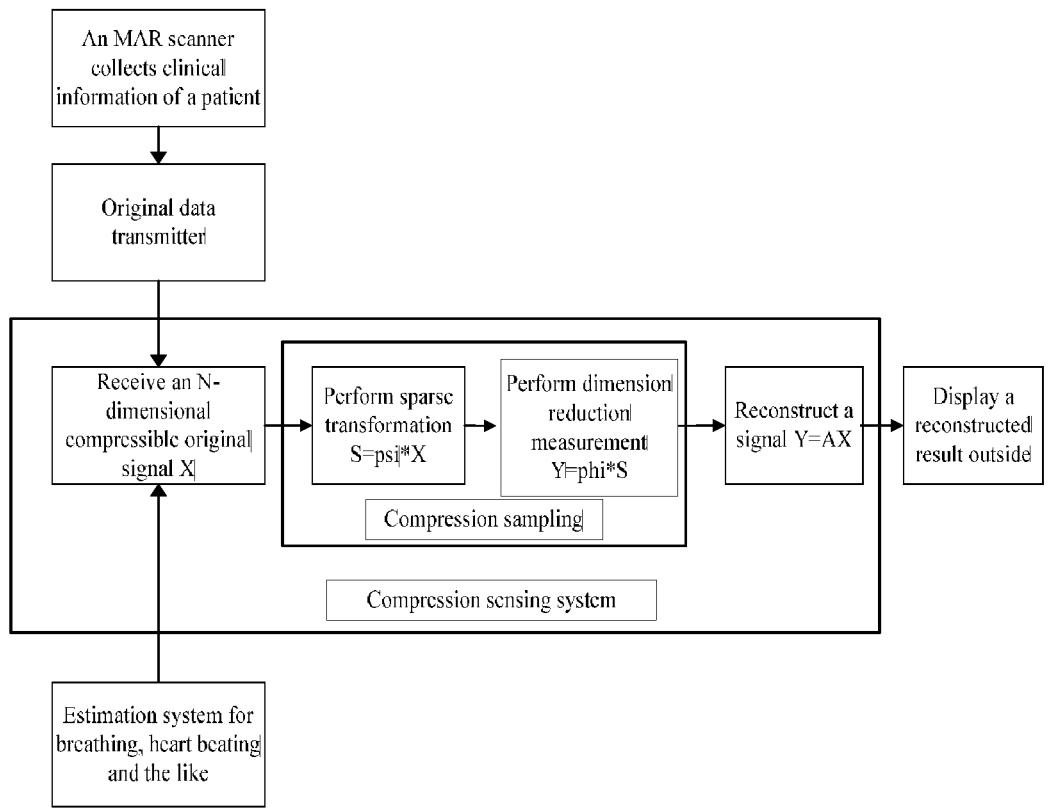
FIG. 3 is a schematic diagram of an image signal collection and reconstruction process disclosed by the present disclosure.

In FIG. 3, psi is ψ, A=φψ. A patient is connected to a whole-body Magnetic Resonance (MR) scanner, and a sensor collects clinical data. At the same time, a respiratory and cardiac motion correction system is clinically set. After A/D (analog to digital) conversion is performed on the original signal through Transmission Control Protocol)/IP (Internet Protocol) and other communication methods, the original signal is sent to a workstation server with a compression sensing program system. The compression sensing system receives the original signal X with a length of N, performs sparse transformation on the signal from space domain to frequency domain, generates S, and projects S to an M-dimensional space by using the measurement matrix to obtain a measured value Y with the length of M, and completes the compression sampling process. The original signal X is then recovered by a reconstruction algorithm. A recovery result is sent to an external scanner, and a reconstruction result is displayed on a display screen.

This embodiment can be applied to medical nuclear magnetic apparatuses, seismic exploration instruments, nuclear magnetic resonance instruments, remote sensing reconnaissance instruments, multi-spectral imaging instruments, synthetic aperture imaging radar, and the like that use compression sensing imaging. A compression sampling module in the compression sensing imaging technology is manly optimized.

In this embodiment, the sensing matrix is split, so that the sparse matrix and the measurement matrix are optimized respectively, which improves the signal sparsity after the transformation of the sparse matrix, and reduces the correlation between the measurement matrix and the sparse matrix. This embodiment is applicable to images with more complex picture features and can recover images with better effects. It can be seen that this embodiment takes reducing the column correlation between the sparse matrix and the measurement matrix as the target function, improves the sparsity and noncorrelation of the sensing matrix, and optimizes the compression sampling effect.

An image compression sampling apparatus provided by an embodiment of the present disclosure is described below. The image compression sampling apparatus described below and the image compression sampling method described above can refer to each other.

Figure 4:
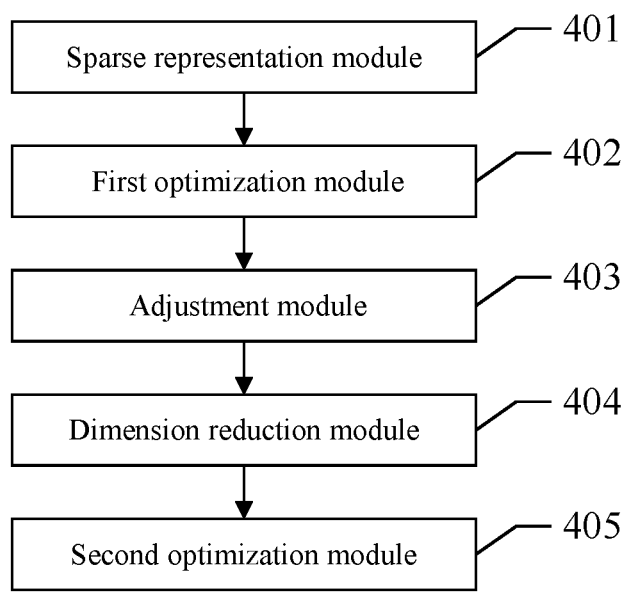
FIG. 4 is a schematic diagram of an image compression sampling apparatus disclosed by the present disclosure.

Referring to FIG. 4, an embodiment of the present disclosure discloses an image compression sampling apparatus, including:

a sparse representation module 401, configured to perform sparse representation on a target image by using an initial sparse matrix to obtain an initial sparse representation result;

a first optimization module 402, configured to quantify the initial sparse representation result to obtain an optimized sparse representation result, and optimize the initial sparse matrix according to the optimized sparse representation result to obtain an optimized sparse matrix;

an adjustment module 403, configured to construct a product matrix by using the optimized sparse matrix and an initial measurement matrix, and adjust absolute values of off-diagonal elements in the product matrix to be less than a correlation threshold;

a dimension reduction module 404, configured to perform singular value decomposition on the adjusted product matrix to obtain a diagonal matrix and a left singular matrix, and update the diagonal matrix according to a quantity of samplings of the initial measurement matrix; and a second optimization module 405, configured to optimize the initial measurement matrix by using the left singular matrix and the updated diagonal matrix to obtain an optimized measurement matrix, and collect image data by using the optimized sparse matrix and the optimized measurement matrix.

In a specific implementation, the sparse representation module is specifically configured to divide the target image into multiple blocks, and represent each block by a single column; splice all the single columns, and obtain an image matrix of the target image; and determine a product of the image matrix and the initial sparse matrix to be the initial sparse representation result.

In a specific implementation, the sparse representation module is specifically configured to perform the sparse representation on the target image by using the initial sparse matrix, and perform rearrangement according to a preset rule to obtain the initial sparse representation result. The preset rule is row/column rearrangement in a zigzag shape, or in a hollow square shape, or after column stretching.

In a specific implementation, the first optimization module is specifically configured to:

determine a sparse error between the optimized sparse representation result and the initial sparse representation result, and solve a minimum value of the sparse error according to a target function to obtain the optimized sparse matrix. The target function is: min{‖S−

$\psi_0 X\|_F^2\}$, where S is the optimized sparse representation result; $\psi 0$ is the initial sparse matrix; X is the image matrix; and F is an F-norm.

In a specific implementation, the first optimization module is specifically configured to:

update the initial sparse matrix according to a second formula to solve the minimum value, and obtain the optimized sparse matrix, the second formula being $\psi = SX^T \times (XX^T)^{-1}$;

where $\psi$ is the optimized sparse matrix; S is the optimized sparse representation result; X is the image matrix; and XT is a transposed matrix of the image matrix.

In a specific implementation, the first optimization module is specifically configured to:

set part of elements in the initial sparse representation result to be 0 according to a preset quantification table to obtain the optimized sparse representation result.

In a specific implementation, the first optimization module is specifically configured to:

update each column in the initial sparse matrix according to a first formula to obtain the optimized sparse matrix. The first formula is $\psi_n = S_n X_n^T \times (X_n X_n^T)^{-1}$;

where $\psi n$ is an nth column in the optimized sparse matrix; Sn is an nth column in the optimized sparse representation result; $X_n$ is an nth column in the image matrix; and $X_n^T$ is an nth column of a transposed matrix of the image matrix.

In a specific implementation, the adjustment module is specifically configured to:

determine, from the product matrix, that off-diagonal elements with absolute values greater than the correlation threshold as target elements; and calculate a product of any target element and a preset iteration factor, and replace the current target element with the product until the absolute values of the off-diagonal elements in the product matrix are all less than the correlation threshold.

In a specific implementation, the adjustment module is specifically configured to:

randomly reserve M nonzero elements in the diagonal matrix, and set remaining nonzero elements to be 0, so as to update the diagonal matrix, where the M is a quantity of rows of the initial measurement matrix.

In a specific implementation, the second optimization module is specifically configured to:

optimize the initial measurement matrix according to a third formula to obtain the optimized measurement matrix. The third formula is $\varphi = \sqrt{W} \times U^T$;

where $\varphi$ is the optimized measurement matrix; W is the updated diagonal matrix; and U is the left singular matrix.

More detailed working processes of all the modules and units in this embodiment can refer to the corresponding contents disclosed in the foregoing embodiment, and details will not repeatedly described here.

It can be seen that this embodiment provides an image compression sampling apparatus. The apparatus can optimize a sparse matrix and a measurement matrix, so that a sparsity of the sparse matrix and a quantity of samplings of the measurement matrix are reasonable values. Meanwhile, the correlation between the sparse matrix and the measurement matrix is reduced. If the correction between the sparse matrix and the measurement matrix is lower, a signal reconstruction effect is better. It can be seen that the sparse matrix and the measurement matrix are optimized as much as possible, complex images can be sampled, and a recovery effect is better.

An image compression sampling device provided by an embodiment of the present disclosure is described below. The image compression sampling device described below and the image compression sampling method and apparatus described above can refer to each other.

Figure 5:
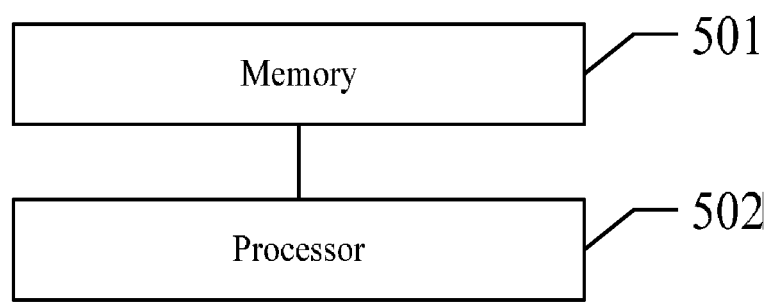
FIG. 5 is a schematic diagram of an image compression sampling device disclosed by the present disclosure.

Referring to FIG. 5, an embodiment of the present disclosure discloses an image compression sampling device, including:

a memory 501, configured to store a computer program; and a processor 502, configured to execute the computer program to implement the method disclosed in any embodiment above.

A readable storage medium provided by an embodiment of the present disclosure will be described below. The readable storage medium described below and the image compression sampling method, apparatus and device described above can refer to each other.

The readable storage medium is configured to store a computer program. The computer program is executed by a processor to implement the image compression sampling method disclosed in the foregoing embodiment. The specific steps of the method can refer to the corresponding contents disclosed in the foregoing embodiments, and details will not be repeated here again.

The terms "first", "second", "third", "fourth", etc. (if any) of the present disclosure are used to distinguish similar objects, and are not necessarily used to describe a specific sequence or a precedence order. It should be understood that data used in this way is interchangeable under appropriate circumstances so that the embodiments described herein can be implemented in an order other than contents illustrated or described herein. In addition, the terms "include" and "have" as well as any of their variations are intended to cover non-exclusive inclusions. For example, processes, methods, or devices that include a series of steps or units are not necessarily limited to those steps or units clearly listed below, but may include other steps or units that are not clearly listed or are inherent to these processes, methods, or devices.

It should be noted that the descriptions of "first", "second", etc. in the present disclosure are only used for descriptive purposes, and cannot be understood as indicating or implying its relative importance or implicitly indicating the quantity of technical features indicated. Therefore, features defined by "first" and "second" can explicitly instruct or impliedly include at least one feature. In addition, the technical solutions between the various embodiments can be combined with each other, but it must be based on what can be achieved by those of ordinary skill in the art. When the combination of technical solutions is contradictory or cannot be achieved, it should be considered that such a combination of technical solutions does not exist, and is not within the scope of protection claimed by the present disclosure.

All the embodiments in this specification are described in a progressive manner. Contents mainly described in each embodiment are different from those described in other embodiments. Same or similar parts of all the embodiments refer to each other.

The steps of a method or algorithm described in conjunction with the embodiments disclosed herein may be directly implemented in hardware, a software module executed by a processor, or a combination of the hardware and the software module. The software module can be placed in a random access memory (RAM), an internal memory, a read only memory (ROM), an electrically programmable ROM, an electrically erasable programmable ROM, a register, a hard disk, a mobile disk, a CD-ROM, or any readable storage medium in other forms known to the technical field.

Specific examples are used herein to illustrate the principle and implementation modes of the present disclosure. The descriptions of the above embodiments are only used to help understand the method and its key thoughts of the present disclosure. Moreover, for those of ordinary skill in the art, according to the ideas of the present disclosure, there will be changes in the specific implementation modes and the scope of application. In summary, the content of this specification should not be construed as limiting the present disclosure.

What is claimed is:

1. An image compression sampling method, comprising:
performing sparse representation on a target image by using an initial sparse matrix to obtain an initial sparse representation result;
quantifying the initial sparse representation result to obtain an optimized sparse representation result, and optimizing the initial sparse matrix according to the optimized sparse representation result to obtain an optimized sparse matrix;
constructing a product matrix by using the optimized sparse matrix and an initial measurement matrix, and adjusting absolute values of off-diagonal elements in the product matrix to be less than a correlation threshold;
performing singular value decomposition on the adjusted product matrix to obtain a diagonal matrix and a left singular matrix, and updating the diagonal matrix according to a quantity of samplings of the initial measurement matrix; and
optimizing the initial measurement matrix by using the left singular matrix and the updated diagonal matrix to obtain an optimized measurement matrix, and collecting image data by using the optimized sparse matrix and the optimized measurement matrix.

2. The image compression sampling method according to claim 1, wherein the step of performing sparse representation on a target image by using an initial sparse matrix to obtain an initial sparse representation result comprises:
dividing the target image into multiple blocks, and representing each block by a single column;
splicing all the single columns, and obtaining an image matrix of the target image; and
determining a product of the image matrix and the initial sparse matrix as the initial sparse representation result.

3. The image compression sampling method according to claim 2, wherein the step of updating the initial sparse matrix according to the optimized sparse representation result to obtain an optimized sparse matrix comprises:
determining a sparse error between the optimized sparse representation result and the initial sparse representation result, and solving a minimum value of the sparse error according to a target function to obtain the optimized sparse matrix; and the target function is: $\min\{\|S-\psi_0 X\|_F^2\}$, wherein S is the optimized sparse representation result; $\psi_0$ is the initial sparse matrix; X is the image matrix; and F is an F-norm.

4. The image compression sampling method according to claim 3, wherein solving a minimum value of the sparse error according to a target function to obtain the optimized sparse matrix comprises:
updating each column in the initial sparse matrix according to a first formula to solve the minimum value, and obtaining the optimized sparse matrix, the first formula being $\psi_n = S_n X_n^T \times (X_n X_n^T)^{-1}$;

where $\psi_n$ is an nth column in the optimized sparse matrix; $S_n$ is an nth column in the optimized sparse representation result; $X_n$ is an nth column in the image matrix; and $X_n^T$ is an nth column of a transposed matrix of the image matrix.

5. The image compression sampling method according to claim 3, wherein solving a minimum value of the sparse error according to a target function to obtain the optimized sparse matrix comprises:
updating the initial sparse matrix according to a second formula to solve the minimum value, and obtaining the optimized sparse matrix, the second formula being $\psi = SX^T \times (XX^T)^{-1}$;
where $\psi$ is the optimized sparse matrix; S is the optimized sparse representation result; X is the image matrix; and $X^T$ is a transposed matrix of the image matrix.

6. The image compression sampling method according to claim 1, wherein the step of performing sparse representation on a target image by using an initial sparse matrix to obtain an initial sparse representation result comprises:
performing the sparse representation on the target image by using the initial sparse matrix, and performing rearrangement according to a preset rule to obtain the initial sparse representation result, wherein the preset rule is a zigzag shape, or a hollow square shape, or a column/row rearrangement after column stretching.

7. The image compression sampling method according to claim 1, wherein the step of quantifying the initial sparse representation result to obtain an optimized sparse representation result comprises:
setting part of elements in the initial sparse representation result to be 0 according to a preset quantification table to obtain the optimized sparse representation result.

8. The image compression sampling method according to claim 1, wherein the step of adjusting absolute values of off-diagonal elements in the product matrix to be less than a correlation threshold comprises:
determining, from the product matrix, off-diagonal elements with absolute values greater than the correlation threshold as target elements; and
calculating a product of any target element and a preset iteration factor, and replacing the current target element with the product until the absolute values of the off-diagonal elements in the product matrix are all less than the correlation threshold.

9. The image compression sampling method according to claim 1, wherein the step of updating the diagonal matrix according to a quantity of samplings of the initial measurement matrix comprises:
randomly reserving M nonzero elements in the diagonal matrix, and setting remaining nonzero elements to be 0, so as to update the diagonal matrix, wherein the M is a quantity of rows of the initial measurement matrix.

10. The image compression sampling method according to claim 1, wherein the step of updating the initial measurement matrix by using the left singular matrix and the updated diagonal matrix to obtain an optimized measurement matrix comprises:
optimizing the initial measurement matrix according to a third formula to obtain the optimized measurement matrix, the third formula being $\varphi = \sqrt{W} \times U^T$;
where $\varphi$ is the optimized measurement matrix; W is the updated diagonal matrix; and U is the left singular matrix.

11. An image compression sampling device, comprising:
a memory, configured to store a computer program; and
a processor, configured to execute the computer program to:
perform sparse representation on a target image by using an initial sparse matrix to obtain an initial sparse representation result;
quantify the initial sparse representation result to obtain an optimized sparse representation result, and optimize the initial sparse matrix according to the optimized sparse representation result to obtain an optimized sparse matrix;
construct a product matrix by using the optimized sparse matrix and an initial measurement matrix, and adjust absolute values of off-diagonal elements in the product matrix to be less than a correlation threshold;
perform singular value decomposition on the adjusted product matrix to obtain a diagonal matrix and a left singular matrix, and update the diagonal matrix according to a quantity of samplings of the initial measurement matrix; and
optimize the initial measurement matrix by using the left singular matrix and the updated diagonal matrix to obtain an optimized measurement matrix, and collect image data by using the optimized sparse matrix and the optimized measurement matrix.

12. The image compression sampling device according to claim 11, the processor is further configured to:
divide the target image into multiple blocks, and represent each block by a single column;
splice all the single columns, and obtain an image matrix of the target image; and
determine a product of the image matrix and the initial sparse matrix as the initial sparse representation result.

13. The image compression sampling device according to claim 12, the processor is further configured to:
determine a sparse error between the optimized sparse representation result and the initial sparse representation result, and solve a minimum value of the sparse error according to a target function to obtain the optimized sparse matrix; and the target function is: $\min\{\|S-\psi_0 X\|F^2\}$, wherein S is the optimized sparse representation result; $\psi_0$ is the initial sparse matrix; X is the image matrix; and F is an F-norm.

14. The image compression sampling device according to claim 13, the processor is further configured to:
updating each column in the initial sparse matrix according to a first formula to solve the minimum value, and obtaining the optimized sparse matrix, the first formula being $\psi_n = S_n X_n^T \times (X_n X_n^T)^{-1}$;
where $\psi_n$ is an nth column in the optimized sparse matrix; Sn is an nth column in the optimized sparse representation result; $X_n$ is an nth column in the image matrix; and $X_n^T$ is an nth column of a transposed matrix of the image matrix.

15. The image compression sampling device according to claim 13, the processor is further configured to:
updating the initial sparse matrix according to a second formula to solve the minimum value, and obtaining the optimized sparse matrix, the second formula being $\psi = SX^T \times (XX^T)^{-1}$;
where $\psi$ is the optimized sparse matrix; S is the optimized sparse representation result; X is the image matrix; and $X^T$ is a transposed matrix of the image matrix.

16. The image compression sampling device according to claim 11, the processor is further configured to:
perform the sparse representation on the target image by using the initial sparse matrix, and perform rearrangement according to a preset rule to obtain the initial sparse representation result, wherein the preset rule is a zigzag shape, or a hollow square shape, or a column/row rearrangement after column stretching.

17. The image compression sampling device according to claim 11, the processor is further configured to:
set part of elements in the initial sparse representation result to be 0 according to a preset quantification table to obtain the optimized sparse representation result.

18. The image compression sampling device according to claim 11, the processor is further configured to:
determining, from the product matrix, off-diagonal elements with absolute values greater than the correlation threshold as target elements; and
calculating a product of any target element and a preset iteration factor, and replacing the current target element with the product until the absolute values of the off-diagonal elements in the product matrix are all less than the correlation threshold.

19. The image compression sampling device according to claim 11, the processor is further configured to:
randomly reserve M nonzero elements in the diagonal matrix, and setting remaining nonzero elements to be 0, so as to update the diagonal matrix, wherein the M is a quantity of rows of the initial measurement matrix.

20. A non-transitory computer-readable storage medium, storing a computer program, wherein when executed by a processor, the computer program is configured to:
perform sparse representation on a target image by using an initial sparse matrix to obtain an initial sparse representation result;
quantify the initial sparse representation result to obtain an optimized sparse representation result, and optimize the initial sparse matrix according to the optimized sparse representation result to obtain an optimized sparse matrix;
construct a product matrix by using the optimized sparse matrix and an initial measurement matrix, and adjust absolute values of off-diagonal elements in the product matrix to be less than a correlation threshold;
perform singular value decomposition on the adjusted product matrix to obtain a diagonal matrix and a left singular matrix, and update the diagonal matrix according to a quantity of samplings of the initial measurement matrix; and
optimize the initial measurement matrix by using the left singular matrix and the updated diagonal matrix to obtain an optimized measurement matrix, and collect image data by using the optimized sparse matrix and the optimized measurement matrix.

* * * * *